United States Patent
Everson et al.

(10) Patent No.: US 7,433,673 B1
(45) Date of Patent: Oct. 7, 2008

(54) METHOD AND SYSTEM FOR PROVIDING LOCATION INFORMATION FOR A WIRELESS LOCAL AREA NETWORK (WLAN)

(75) Inventors: John M. Everson, Kansas City, MO (US); Jason R. Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 168 days.

(21) Appl. No.: 11/015,571

(22) Filed: Dec. 17, 2004

(51) Int. Cl.
*H04Q 7/20* (2006.01)
*H04Q 7/38* (2006.01)
*H04M 11/04* (2006.01)
*H04L 12/66* (2006.01)

(52) U.S. Cl. .............. 455/404.1; 455/403; 455/414.1; 379/37; 370/352

(58) Field of Classification Search ............. 455/557, 455/556.1, 456.1, 456.2, 456.3, 404.1, 404.2, 455/410, 412.1, 415, 426.2, 432.1, 435.1, 455/456.6, 403, 500, 521, 466, 422.1, 457, 455/517, 414.1, 414.3, 414.4, 445, 550.1; 379/37; 370/352
See application file for complete search history.

(56) References Cited

U.S. PATENT DOCUMENTS

| | | | |
|---|---|---|---|
| 6,493,629 B1 | 12/2002 | Van Bosch | |
| 6,665,611 B1 | 12/2003 | Oran et al. | |
| 2002/0080759 A1 | 6/2002 | Harrington et al. | |
| 2002/0187779 A1* | 12/2002 | Freeny, Jr. | 455/422 |
| 2003/0036374 A1* | 2/2003 | English et al. | 455/403 |
| 2003/0148757 A1* | 8/2003 | Meer | 455/414 |
| 2003/0210671 A1 | 11/2003 | Eglin | |
| 2003/0216144 A1* | 11/2003 | Roese et al. | 455/456.1 |
| 2004/0057425 A1 | 3/2004 | Brouwer et al. | |
| 2004/0198397 A1* | 10/2004 | Weiss | 455/456.5 |
| 2005/0083911 A1 | 4/2005 | Grabelsky et al. | |
| 2006/0023747 A1* | 2/2006 | Koren et al. | 370/469 |
| 2006/0084430 A1* | 4/2006 | Ng | 455/426.1 |

OTHER PUBLICATIONS

Tariq et al., "Mobility Aware Server Selection for Mobile Streaming Multimedia Content Distribution Networks," *Proc. 8th Int. Workshop on Web Content Caching and Distribution* (2003), no month listed.
Donny Jackson, "Nortel proposes VoIP 911 solution," *Mobile Radio Technology*, May. 1, 2004.

(Continued)

*Primary Examiner*—Melody Mehrpour

(57) ABSTRACT

Each wireless access point in a wireless local area network (WLAN) is allocated a set of one or more identifiers. A correlation database stores information that relates the geographic location of each wireless access point and the identifiers allocated to it. When a mobile node associated with a wireless access point in the WLAN originates a 9-1-1 or other emergency call, one of the wireless access point's identifiers is included in the call origination request. By querying the correlation database, the wireless access point's geographic location may be determined from the identifier. When a public safety answering point (PSAP) answers the mobile node's call, the PSAP may obtain the geographic location of the wireless access point with which the mobile node is associated. This location information could be pushed to the PSAP, or the PSAP could obtain the location information by querying the correlation database.

20 Claims, 2 Drawing Sheets

OTHER PUBLICATIONS

Proxim Corporation, "WI-FI In The Enterprise: Applications, Environments, Requirements and Solutions," Position Paper, 2004, no month listed.

J. Pulver, "pulver.com comments on the FCC issued E911 report," Nov. 4, 2002.

J. Pulver, "pulver.com comments on the Hatfield E911 Report," Oct. 30, 2002.

H. Schulzrinne, "Providing Emergency Call Services for SIP-based Internet Telephony," Internet Draft, Jul. 13, 2000.

H. Schulzrinne, et al., "Emergency Services for Internet Telephony Systems," Internet Draft, Oct. 18, 2004.

D. Passmore and J. Freeman, "The Virtual LAN Technology Report," May 1996.

Intel Corporation, "Virtual LANs: Flexible network segmentation for high-speed LANs," Intel Network Information Series, 1997, no month listed.

Avaya, Inc., "Comments on IP Telephony Support for Emergency Calling Service," TR 41.4/01-08-002, Jul. 25, 2001.

Cisco Systems, "Cisco Emergency Responder Version 1.2(2)," Data Sheet, 2004, no month listed.

Mo Zonoun, "IP Telephony Support for Emergency Calling Service," TR41.4.1/01-08-001, Aug. 22, 2001.

* cited by examiner

METHOD AND SYSTEM FOR PROVIDING LOCATION INFORMATION FOR A WIRELESS LOCAL AREA NETWORK (WLAN)

BACKGROUND

1. Field of the Invention

The present invention relates to telecommunications and, more particularly, to methods and systems for providing location information for a wireless local area network (WLAN).

2. Description of Related Art

For certain types of calls, it can be advantageous to obtain information regarding the geographic location of the caller. For example, when a public safety answering point (PSAP) answers an emergency services call, such as a 9-1-1 call, it is desirable for the PSAP to be able to automatically determine the geographic location of the caller in order to dispatch assistance to the caller's location as quickly as possible. For calls made from landline telephones, which typically have relatively fixed geographic locations, the PSAP typically determines the caller's geographic location based on the calling party number included in the SS7 or other signaling that is used to route the call to the PSAP. In particular, the PSAP may consult a database, such as an automatic location identification (ALI) database, to determine what physical location is associated with the calling party number. The ALI database may characterize the location associated with the calling party number in terms of a street address, a floor or section of a building, or in some other manner.

For calls made using a wireless telephone and a wireless wide area network (WWAN), a wireless location technology, such as GPS, maybe used to locate the wireless telephone, e.g., to within 150 meters or less. The geographic location of the wireless telephone obtained in this way may be stored in a mobile position center (MPC), e.g., in terms of latitude and longitude. Thus, when a PSAP receives an emergency services call from a wireless telephone, the PSAP may also receive information stored in the MPC regarding the caller's location. In some cases, the caller's geographic location may be pushed to the PSAP, e.g., in the signaling used to route the call to the PSAP. In other cases, the PSAP may receive the caller's geographic location by querying the MPC. If the geographic location that the PSAP obtains in this way is provided in terms of latitude and longitude, then the PSAP may consult another database to find the corresponding street address.

Increasingly, however, packet networks are being used for voice communication, including emergency services calls. For example, wireless local area networks (WLANs) may be used for voice communications. Thus, the devices used for such voice communication may be mobile nodes that are able to change their point of connectivity to the packet network. Because of this mobility, mobile nodes may not be reliably associated with fixed geographic locations. In addition, it may be difficult or expensive to use the wireless location technologies used by WWANs to locate mobile nodes communicating with WLANs.

Accordingly, there is a need for providing additional ways of determining the geographic locations of callers that are using WLANs for communication.

SUMMARY

In a first principal aspect, an exemplary embodiment of the present invention provides a method of providing location information for a wireless local area network (WLAN) having a plurality of wireless access points. In accordance with the method, to each one of the wireless access points in the WLAN is allocated a set of one or more identifiers specific to that wireless access point. A mobile node is associated with a given wireless access point in the WLAN. A message originating from said mobile node is received. The message includes a given identifier from the given wireless access point's set of one or more identifiers. A geographic location of the given wireless access point is determined from the given identifier included in the message, whereby the given identifier indicates that the mobile node is located within a communication range of the geographic location of the given wireless access point.

In a second principal aspect, an exemplary embodiment of the present invention provides a system comprising: (1) a wireless local area network (WLAN) having a plurality of wireless access points; (2) a call control system for controlling voice-over-packet communications in the WLAN; and (3) a correlation database. Each one of the wireless access points in the WLAN is allocated a set of one or more identifiers specific to that wireless access point. The correlation database stores correlations between geographic locations of the wireless access points and identifiers allocated to the wireless access points.

DETAILED DESCRIPTION OF EXEMPLARY EMBODIMENTS

1. Overview

Figure 1:
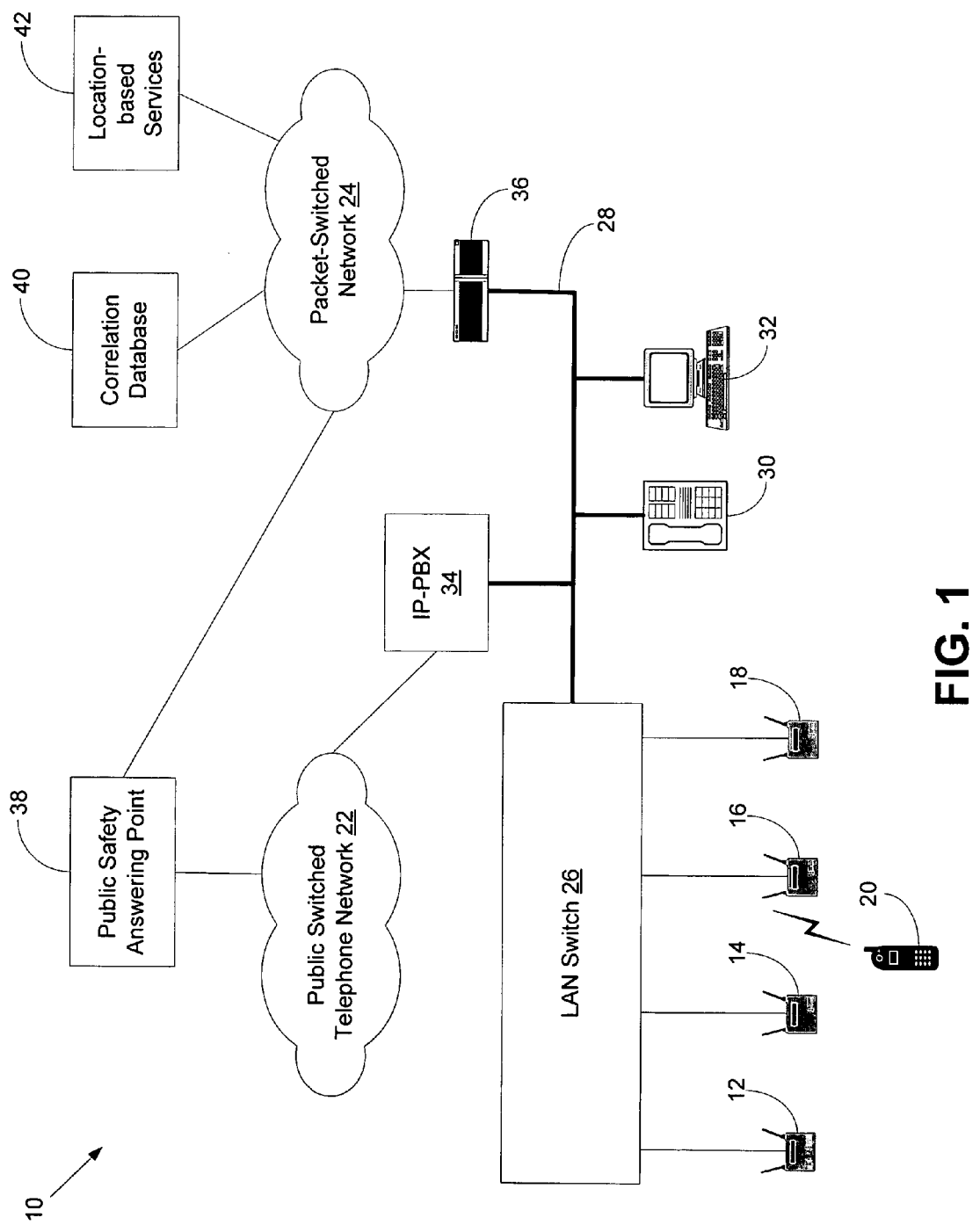
FIG. 1 is a simplified block diagram of a wireless telecommunications system, in accordance with an exemplary embodiment of the present invention.

In its exemplary embodiments, the present invention is directed to providing location information for a wireless local area network (WLAN) that may include a plurality of wireless access points. The location information could be used, for example, by a public safety answering point (PSAP) when the PSAP answers a 9-1-1 or other emergency services call that a mobile node has placed over a particular wireless access point in the WLAN. Alternatively or additionally, the location information could be used by other location-based services, for example, to provide directions or to suggest nearby places of interest.

Each wireless access point in the WLAN may be allocated a set of one or more identifiers specific to that wireless access point. Correlations between the identifiers allocated to the wireless access points and the geographic locations of the wireless access points in the WLAN may be stored, e.g., in a correlation database. The geographic locations of the wireless access points may be characterized in terms of latitude/longitude, street address, building name or number, floor number, or in some other manner. Thus, each identifier may indicate a particular wireless access point in the WLAN, the geographic location of which may be determined from the correlation database. In one application of this approach, the identifiers may be used to provide location information for calls originating from the WLAN, as described in more detail below.

For example, when a mobile node uses a wireless access point to place a 9-1-1 or other emergency services call, an identifier specific to that wireless access point may be included (by either the originating mobile node or another network element) in the signaling used to set up the call. The geographic location of the wireless access point used to originate the call may then be determined from the identifier by querying the correlation database. In this way, the PSAP that receives a 9-1-1 or other emergency services call may also receive location information in the form of the geographic location of the wireless access point used to place the call. The PSAP may receive this location information via either a "push" or a "pull" process.

The wireless communication in the WLAN may conform to or make use of IEEE 802.11x standards, Bluetooth specifications, HomeRF specifications, or HiperLAN standards, for example. Various types of mobile nodes, such as wireless handsets, wireless personal digital assistants (PDAs), and/or wirelessly equipped laptop computers, may be able to use the WLAN to send and receive voice, data, and/or other media. Such mobile nodes may have a dual-mode capability in that they may also be able to communicate via a wireless wide area network (WWAN), e.g., using CDMA or GSM.

The WLAN may be used by an enterprise to provide wireless coverage within an area used by the enterprise, e.g., within a building, within part of a building, or within a campus. The WLAN may be only one part of the enterprise's voice communication network, which may also include, for example, landline telephones. In some cases, the voice communications over the WLAN may be limited to within the enterprise network. In other cases, the WLAN may be used for voice communication outside of the enterprise network, e.g., via the Internet and/or the public switched telephone network (PSTN). An IP-PBX, IP-Centrex, softswitch, or other call control system may be used to control voice-over-packet (VoP) communication within the enterprise network and/or with other networks.

Mobile nodes may use the WLAN to make voice calls, including emergency services calls, such as 9-1-1 calls, which may be answered by a PSAP. In some cases, the emergency services calls carried by the WLAN may be answered by a PSAP that is associated with the enterprise. In other cases, the emergency services calls carried by the WLAN may be routed outside of the enterprise, e.g., via the PSTN, and answered by a PSAP associated with a larger jurisdiction, such as a county, city, or town.

In an exemplary embodiment, the WLAN includes a plurality of wireless access points. Each wireless access point has a limited effective range, e.g., 100 meters indoors or 300 meters outdoors, depending on the power levels used, the location of obstructions, and/or other factors. Therefore, determining which wireless access point a mobile node is communicating with, e.g., to make an emergency services call, can provide a useful indication of the mobile node's geographic location.

When a mobile node associates with a wireless access point in the WLAN, the mobile node may be assigned an identifier from that wireless access point's set of identifiers. While the mobile node remains associated with that wireless access point, the identifier assigned to the mobile node may be included in messages originating from the mobile node. In some cases, the mobile node may transmit a message with the identifier already included. In other cases, the mobile mode may transmit a message without the identifier included. In such cases, a network element that receives, forwards, or processes messages transmitted by the mobile node, e.g., the wireless access point communicating with the mobile node or a LAN switch to which the wireless access point is connected, may add the identifier to the message transmitted by the mobile node. In either case, because the identifier is specific to a particular wireless access point in the WLAN, the identifier indicates that the mobile node is within a communication range of that particular wireless access point.

The one or more identifiers allocated to each wireless access point may be ad hoc identifiers used primarily or exclusively for providing location information, or they may be identifiers, such as Internet Protocol (IP) addresses, that are used for other communication purposes. In one exemplary embodiment, the identifiers are dynamically assigned IP addresses, e.g., using the Dynamic Host Configuration Protocol (DHCP). Thus, each time a mobile node associates with a new wireless access point, the mobile node may do a DHCP request to obtain an IP address from a range of IP addresses allocated to that wireless access point. The wireless access point may serve as the DHCP server in this process. Alternatively, another network element could serve as the DHCP server. For example, each wireless access point may be connected to a distinct port of a LAN switch that also serves as the DHCP server. In this way, when the switch receives a DHCP request via a particular port, the switch may allocate an IP address from the range allocated to the wireless access point connected to that port.

In another exemplary embodiment, the identifiers are virtual local area network (VLAN) tags. For example, each wireless access point may be connected to a distinct port of a LAN switch, and each port may be assigned to a distinct VLAN. Thus, when a switch receives a packet from a wireless access point, the switch determines what VLAN it belongs to based on what port the packet arrived on. The switch may then add a VLAN tag to the packet to indicate which VLAN it belongs to.

Other identifiers could be used in other embodiments. For example, the identifier could correspond to the MAC address of the wireless access point or to a name given to the wireless access point. Still other types of identifiers could be used.

Whatever identifier is used, the identifier may be included in messages originating from the mobile node. The identifier may, in turn, be used to determine the geographic location of the wireless access point associated with the mobile node (e.g., using the correlation database). In this way, the identifier provides location information regarding the mobile node. In particular, the identifier indicates that the mobile node is within a communication range of a particular wireless access point with a known geographic location. This location information can be used in different ways, for example by a PSAP receiving a 9-1-1 or other emergency services call from the mobile node. When the PSAP receives the call, the PSAP may also obtain the mobile node's location information from either a "push" or a "pull" process.

In a push process, an IP-PBX, or other call control system for the WLAN, may recognize the call originated by the mobile node as an emergency services call and responsively obtain the identifier included in the messaging transmitted by the mobile node. The IP-PBX may then query the correlation database to obtain the geographic location of the wireless access point corresponding to the identifier and push this location information to the PSAP, e.g., in the SS7, SIP, or other signaling used to set up the call to the PSAP.

In a pull process, the PSAP receives calling party information that includes the identifier assigned to the mobile node. The PSAP may then send query that includes the identifier to the correlation database. The correlation database may then respond with the geographic location of the wireless access point allocated that identifier. In this way, the PSAP may obtain the geographic location of the wireless access point that the mobile node used to originate the call and, thus, determine that the mobile node is within a communication range of that geographic location.

2. Exemplary Architecture

FIG. 1 is a simplified block diagram of an exemplary wireless telecommunications system 10. Wireless telecommunications system 10 includes a WLAN that comprises wireless access points 12, 14, 16, and 18. Although the WLAN in FIG. 1 has four wireless access points, it is to be understood that the WLAN could have a greater or fewer number of wireless access points. Wireless access points 12, 14, 16, and 18 each define a wireless coverage area within which each wireless access point is able to wirelessly communicate with one or more mobile nodes, such as mobile node 20. For example, mobile node 20 could be in wireless communication with wireless access point 16, as shown in FIG. 1. However, it is to be understood, that when mobile node 20 moves to a different location, mobile node 20 could become disassociated with wireless access point 16 and may become associated with a different wireless access point (e.g., wireless access point 14 or 18) for wireless communication.

Mobile node 20 may use the WLAN to send and receive voice, data, and/or other media. More particularly, mobile node 20 may use the WLAN to originate and to receive voice-over-packet (VoP) calls. In some cases, such VoP calls may be limited to the enterprise's own network. In other cases, however, such VoP calls may be carried over the public switched telephone network (PSTN) 22 or over a wide area packet-switched network 24 (such as the Internet), as described in more detail below.

In the embodiment shown in FIG. 1, wireless access points 12, 14, 16, and 18 are connected to LAN switch 26, which, in turn is connected to LAN 28. LAN 28 may also be connected to other types of devices. For example, LAN 28 may be connected to one or more VoP communication devices, such as VoP telephone 30. LAN 28 may also be connected to devices that do not engage in VoP communication, such as desktop computer 32.

A call control system, such as IP-PBX 34, may be connected to LAN 28 to control VoP communications, such as VoP communications involving mobile node 20. IP-PBX 34 may be connected to PSTN 22 so as to enable VoP communication with endpoints accessible via PSTN 22. LAN 28 may also be connected to packet-switched network 24, e.g., via router 36, so as to enable VoP communication with endpoints accessible via packet-switched network 24. In this way, mobile node 20 may be able to send and receive VoP calls via PSTN 22 and/or packet-switched network 24.

In particular, mobile node 20 may be able to originate calls to a public safety answering point (PSAP) 38. Such calls may include 9-1-1 calls or other emergency services calls. In some cases, PSAP 38 may be reached via PSTN 22, as shown in FIG. 1. In such cases, signaling such as SS7 may be used to set up calls to PSAP 38. In other cases, PSAP 38 may be reached via packet-switched network 24, in which case signaling such as SIP signaling may be used to set up calls to PSAP 38. In still other cases, PSAP 38 may be connected to IP-PBX 34 via a dedicated trunk, or PSAP 38 may be connected directly to LAN 28 and use VoP communication. As described in more detail below, the location information for a mobile node originating a call to PSAP 38, or the identifier that may be used to obtain the location information, may be included in the signaling used to set up the call to PSAP 38.

As described above, wireless access points 12, 14, 16, and 18 are each allocated a set of one or more identifiers (e.g., IP addresses, VLAN tags, MAC addresses, or other identifiers). The geographic locations of wireless access points 12, 14, 16, and 18, and their corresponding identifiers, are stored in correlation database 40. Correlation database 40 may be located in system 10 such that it can be queried by network elements that seek location information. For example, correlation database 40 may be connected packet-switched network 24, as shown in FIG. 1. Alternatively, correlation database 40 could be connected to PSTN 22, to LAN 28, or it could be located elsewhere.

Network elements that may query correlation database 40 may include IP-PBX 34. For example, IP-PBX 34 may query correlation database 40 to obtain location information and then push the location information to PSAP 38. Alternatively or additionally, PSAP 38 may query correlation database to obtain location information. The queries to correlation database 40 could be, for example, packet-based queries via packet-switched network 24 or SS7-based queries via PSTN 22, depending on how correlation database 40 is located in system 10.

In addition, other network elements, such as location-based services 42, may query correlation database 40 to obtain location information. For example, mobile node 20 may transmit a message (containing the identifier) that requests location-based information, such as directions or the locations of nearby restaurants, stores, or other places of interest. In processing the request from mobile node 20, location-based services 42 may query correlation database 40 to determine the location of the wireless access point associated with mobile node 20, based on the identifier contained in the message.

3. Exemplary Operation

Figure 2:
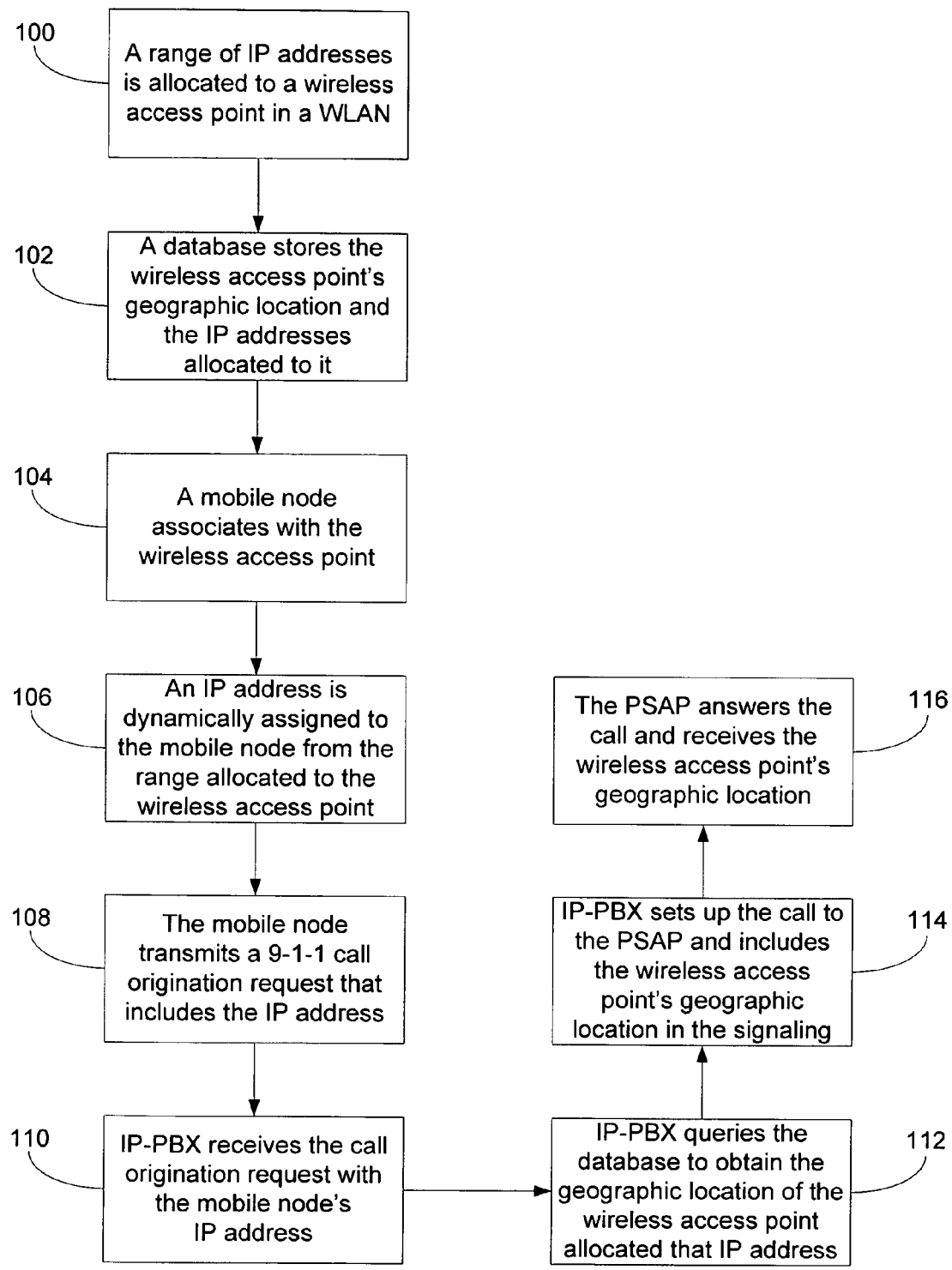
FIG. 2 is a flow chart illustrating a method of providing location information, in accordance with an exemplary embodiment of the present invention.

An exemplary method for providing location information is illustrated in FIG. 2. The method of FIG. 2 may use the network architecture shown in FIG. 1. The method may begin with allocating a range of IP addresses to a wireless access point in a WLAN, e.g., wireless access point 16, as indicated by block 100. It is to be understood that the wireless access point discussed in this example may be one of a plurality of wireless access points in the WLAN, with each being allocated a specific range of IP addresses. It is also to be understood that although the identifiers used in this example are IP addresses, the identifiers could alternatively be VLAN tags, MAC addresses, or other types of identifiers, as discussed above.

A correlation database stores the wireless access point's geographic location and the IP addresses allocated to it, as indicated by block 102. In this way, the geographic locations of the wireless access points in the WLAN and the IP addresses allocated to them may be correlated together. Moreover, the correlation database can be queried to determine the geographic location of the wireless access point allocated a given IP address.

At some point, a mobile node, e.g., mobile node 20, associates with the wireless access point, as indicated by block 104. Once associated, the mobile node is dynamically assigned an IP address from the range allocated to that wireless access point, as indicated by block 106. This assignment could occur in response to a DHCP request from the mobile node, in which case the wireless access point or another network element (e.g., a LAN switch connected to the wireless access point) may serve as the DHCP server. Once the mobile node is assigned the IP address, the mobile node may include the IP address in messages that it transmits via the wireless access point.

In particular, the mobile node may, at some point, transmit a 9-1-1 call origination request that includes the IP address, as indicated by block 108. The call control system that controls VoP communication in the WLAN receives the call origination request with the mobile node's IP address, as indicated by step 110. In this example, IP-PBX 34 shown in FIG. 1 may serve as the call control system. However, it is to be understood that the call control system could be an IP-Centrex system, softswitch, or other type of call control system in other examples.

The IP-PBX recognizes the call as an emergency services call for a public safety answering point (PSAP) that should also receive location information. In this example, the IP-PBX determines that PSAP 38, which is accessible via PSTN 22, should receive the call. As noted above, the PSAP could receive the location information from either a "push" process or a "pull" process. In this example, the IP-PBX pushes the location information to the PSAP. Thus, the IP-PBX queries the correlation database to obtain the geographic location of the wireless access point allocated the IP address that the mobile node included in its call origination request, as indicated by block 112.

The IP-PBX then sets up the call to the PSAP and includes the wireless access point's geographic location in the signaling, as indicated by block 114. For example, IP-PBX 34 may use SS7 signaling to set up the call to PSAP 38 via PSTN 22. When the PSAP answers the call, the PSAP also receives the wireless access point's geographic location in the signaling used to set up the call, as indicated by block 116. In this way, the PSAP is notified that the mobile node that originated the call is within a communication range of the wireless access point's geographic location, e.g., within 100 meters indoors or 300 meters outdoors.

Although in the example illustrated in FIG. 2 the location information was pushed to the PSAP, it is to be understood that the PSAP could obtain the location information in other ways. For example, the IP-PBX may not itself obtain the location information but may instead include the mobile node's IP address in the signaling used to set up the call to the PSAP. The PSAP may then query the correlation database to determine the geographic location of the wireless access point allocated the IP address included in the signaling.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of providing location information for a wireless local area network (WLAN), said WLAN having a plurality of wireless access points, said method comprising:
    allocating to each one of said wireless access points in said WLAN a set of one or more identifiers specific to said one of said wireless access points;
    storing in a correlation database correlations between geographic locations of said wireless access points and identifiers allocated to said wireless access points;
    associating a mobile node with a given wireless access point in said WLAN; and
    receiving a message originating from said mobile node, said message including a given identifier from said given wireless access point's set of one or more identifiers, wherein said message comprises a request to originate a call; and
    determining a geographic location of said given wireless access point from said given identifier included in said message, whereby said given identifier indicates that said mobile node is located within a communication range of said geographic location of said given wireless access point.

2. The method of claim 1, wherein said given identifier is an Internet Protocol (IP) address, said method further comprising:
    dynamically assigning said IP address to said mobile node.

3. The method of claim 1, further comprising:
    said mobile node transmitting said message with said given identifier included.

4. The method of claim 1, wherein said given identifier is a name of said wireless access point.

5. The method of claim 1, wherein said given identifier is a virtual local area network (VLAN) tag.

6. The method of claim 5, further comprising:
    said mobile node transmitting said message without said given identifier included; and
    a local area network (LAN) switch connected to said given wireless access point adding said given identifier to said message.

7. The method of claim 1, wherein said call is an emergency services call.

8. The method of claim 7, wherein said emergency services call is a 9-1-1 call.

9. The method of claim 8, further comprising:
    a public safety answering point (PSAP) receiving said 9-1-1 call.

10. The method of claim 9, further comprising:
    said PSAP receiving said geographic location of said given wireless access point.

11. The method of claim 10, wherein said PSAP receives said geographic location of said given wireless access point in signaling used to set up said 9-1-1 call.

12. The method of claim 9, further comprising:
    said PSAP receiving said given identifier in signaling used to set up said 9-1-1 call;
    said PSAP sending said correlation database a query including said given identifier; and
    said PSAP receiving said geographic location of said given wireless access point from said correlation database in response to said query.

13. A system, comprising:
    a wireless local area network (WLAN) having a plurality of wireless access points, wherein each one of said wireless access points is allocated a set of one or more identifiers specific to said one of said wireless access points;
    a public safety answering point (PSAP):
    a communication network for voice communication between said WLAN and said PSAP;
    a call control system for controlling voice-over-packet (VoP) communications in said WLAN; and
    a correlation database storing correlations between geographic locations of said wireless access points and identifiers allocated to said wireless access points, wherein said call control system includes geographic locations from said correlation database in signaling used to set up emergency services calls to said PSAP through said communication network.

14. The system of claim 13, wherein said WLAN includes a local area network (LAN) switch and each one of said wireless access points is connected to a distinct port of said LAN switch.

15. The system of claim 13, wherein said call control system is an IP-PBX.

16. The system of claim 13, wherein said call control system is an IP-Centrex system.

17. The system of claim 13, wherein said call control system is a softswitch.

18. The system of claim 13, wherein said communication network is a public switched telephone network and said signaling comprises SS7 signaling.

19. The system of claim 13, wherein said communication network is a packet-switched network.

20. The system of claim 19, wherein said signaling comprises Session Initiation Protocol (SIP) signaling.

* * * * *